(12) United States Patent
Solomon (10) Patent No.: US 6,321,480 B1
(45) Date of Patent: Nov. 27, 2001

(54) SELF-PROPELLED WATERFOWL DECOY

(76) Inventor: Walter Solomon, 505 N. Price, Marshall, TX (US) 75670

( * ) Notice: Subject to any disclaimer, the term of this patent is extended or adjusted under 35 U.S.C. 154(b) by 0 days.

(21) Appl. No.: 09/247,842

(22) Filed: Feb. 10, 1999

(51) Int. Cl.[7] .................................................. A07M 31/06
(52) U.S. Cl. ........................................................ 43/3
(58) Field of Search ............................... 43/3; 446/158, 446/157, 156, 164

(56) References Cited

U.S. PATENT DOCUMENTS

| | | | | |
|---|---|---|---|---|
| 3,628,286 | * | 12/1971 | Mashabiro | 46/247 |
| 5,809,683 | * | 9/1998 | Solomon | 43/3 |
| 5,930,936 | * | 8/1999 | Parr | 43/3 |

* cited by examiner

*Primary Examiner*—Charles T. Jordan
*Assistant Examiner*—J Lofdahl
(74) *Attorney, Agent, or Firm*—Law Office of D. Scott Hemingway (57) ABSTRACT

A self-propelled waterfowl decoy to float on and propel itself along the surface of a body of water includes a body with a hollow interior and two opposed sides with shaft apertures extending through the two sides in opposed relation to each other, a drive assembly with two battery powered electric motors, each having a rotatable output shaft, disposed in the hollow interior of the body with the output shafts extending through the shaft apertures on each side of the body of the decoy, and a pair of paddle wheel assemblies each connected to an output shaft of one of the motors and each having a hub and at least one paddle extending outwardly from the hub, so that upon activation of the motors the paddles rotate to engage the surface of the water to propel the decoy along the surface and splash water toward the rear of the decoy.

20 Claims, 12 Drawing Sheets

SELF-PROPELLED WATERFOWL DECOY

FIELD OF THE INVENTION

The present invention generally relates to waterfowl decoy devices, and in its preferred embodiments more specifically relates to waterfowl decoy devices that provide movement and splashing action to simulate the appearance of live waterfowl.

BACKGROUND OF THE INVENTION

Waterfowl decoys have long been used by hunters in an effort to attract ducks and other waterfowl to a particular body of water or to a particular location in a body of water. Traditionally, such decoys have been made as inanimate structures that are placed on a body of water and allowed to float passively thereon, without movement of any kind. In the past, passive stationary decoys have been reasonably effective in attracting waterfowl to land in proximity to the decoy or decoys. However, waterfowl adapt to changes in their environment, and in response to increased hunting pressure many waterfowl have become more cautious in their behavior and are less likely to be attracted by stationary decoys. It appears that many waterfowl have learned to distinguish the difference between live birds and stationary decoys. One of the primary difference between live birds and traditional decoys is movement in the water and splashing of the water. Live waterfowl are constantly moving their bodies and splashing water as they move and feed.

Attempts have been made in the past to overcome the problems associated with stationary decoys, and decoys that exhibit various forms of motion are known in the prior art. For example, U.S. Pat. No. 2,799,960 to Riley discloses a decoy with a motor driven propeller and movable head. Other examples of propeller driven decoys include U.S. Pat. No. 2,814,146 to Propp; U.S. Pat. No. 2,835,064 to Webb; U.S. Pat. No. 3,074,195 to Vanderpool; and U.S. Pat. No. 3,000,128 to McAda. U.S. Pat. No. 2,443,040 to Jones and U.S. Pat. No. 2,704,416 to Laird disclose decoys with fully submerged paddle mechanisms to impart movement to a decoy. Other examples include U.S. Pat. No. 2,747,314 to McGregor, which discloses a decoy apparatus with movable wings and head; U.S. Pat. No. 2,480,390, which discloses a decoy with movable wings; U.S. Pat. No. 4,896,448, which discloses a decoy with movable wings; and British Patent No. 383,031, which discloses a bird decoy with movable wings.

The efforts known in the prior art have been effective in producing one or more forms of motion, but have been much less effective in producing lifelike motion and imparting a realistic appearance to decoys, and in producing water movement around the decoys. Accordingly, they have been only marginally successful in providing the desired effect of attracting waterfowl. Many of the apparatus designs known in the prior art are complex in structure, adding to the cost of production and to the difficulty of use. There remains a need for a decoy apparatus that produces not only movement of the decoy itself, but also movement of the water surrounding the decoy so as to realistically simulate the appearance of live waterfowl and the movement of the water created by live waterfowl.

SUMMARY OF THE INVENTION

The present invention provides a waterfowl decoy that addresses and overcomes the deficiencies and problems of the prior art by producing movement of the decoy itself and by simultaneously producing splashing of the water around the decoy. The decoy movement and water splashing exhibited by the decoy of the present invention are simultaneously produced by a drive apparatus that is simple in structure and operation, inexpensive to produce, and easy to install in a hollow decoy body of conventional design.

The present invention utilizes a conventional floating decoy body, generally comprising a body with a hollow interior, a top, two opposing sides, a head end, and a tail end. An opening is formed in the top of the decoy body to provide access to the hollow interior for installation of the drive assembly, for installation and adjustment of wing assemblies and foot assemblies, and for operation of the drive assembly. The decoy body is also provided with a pair of shaft apertures formed in the opposing sides of the body through which drive shafts extend, and a pair of paddle wheels, each attached to one of the drive shafts.

The drive assembly of the preferred embodiment of the present invention includes a pair of drive means, preferably battery powered electric motors, each of which drives a rotary shaft that extends through one of the shaft apertures in the sides of the body of the decoy and to which a paddle is attached. In the preferred embodiment the output shaft of each motor comprises the drive shaft, and each motor is oriented in the hollow interior of the body with the drive shaft extending toward the adjacent side of the body and through the shaft aperture therein, so that the drive shafts are generally parallel to the surface of the water in which the decoy will float. The shaft apertures are positioned in the sides of the body, and the drive means are positioned in the hollow interior of the body, so that the drive shafts are disposed a distance above the surface of the water when the decoy is floating thereon. A paddle wheel, which includes a plurality of paddles extending outwardly from its center, is connected to each drive shaft so that rotation of the drive shaft will cause rotation of the paddle wheel. The paddle extend outwardly from the center of the paddle wheel a sufficient distance so that each paddle is drawn through the water as the paddle wheel rotates.

When the assembled decoy is placed in a body of water the body of the decoy will float on the water with the drive shafts disposed generally parallel to and above the surface and with the plane of each paddle wheel generally perpendicular to the surface of the water. When the drive means is activated the drive shafts and attached paddle wheels rotate, causing the paddles to enter the water, be drawn through the water, and then exit from the water, propelling the decoy forward. As each paddle leaves the water it throws a small volume of water upward and toward the rear of the decoy, creating ripples and splashes in the water as the decoy moves forward in the water. The unique combination of forward movement and splashing provided by the decoy of the invention effectively simulates the movement of live birds and produces ripples and splashes in the water that are similar to those produced by the behavior of live birds.

The decoy of the invention may be provides with alternative embodiments of the drive assembly, if desired. A single motor, with a single output shaft, may be utilized to rotate the drive shafts through a gear box or other transmission assembly, or a single motor with dual opposed output shafts may be used, as nonlimiting examples. The structure and features of the preferred and various alternative embodiments of the invention are disclosed in detail with reference to the accompanying drawing figures.

DETAILED DESCRIPTION OF THE PREFERRED AND CERTAIN ALTERNATIVE EMBODIMENTS

Referring to the drawing figures, the preferred embodiment of the decoy of the invention will be seen to generally include a hollow decoy body 1, a drive assembly 2, and a pair of paddle wheel assemblies 3.

The apparatus of the invention is designed for use with a conventional commercial waterfowl decoy constructed with body 1 surrounding a hollow interior 4. Body 1 includes a top 5, opposing sides 6, a head end 7, and a tail end 8. The body of the decoy is formed with, or a commercially obtained decoy is prepared by forming, a flap 9 in the top 5 to provide an opening for insertion of the drive assembly. Flap 9 may be lifted to expose an opening into the interior 4 of body 1, and then pushed back into place to close the opening. Flap 9 is secured in place in a closed position by latch 10, preferably a semi-rigid plastic strip secured to the top of the body with fastener 11. Fasteners used in the construction of the apparatus of the invention may be rivets, eyelets, brads, or other convenient fastening devices. Fastener 11 allows latch 10 to rotate around the fastener so that the latch can be moved to selectively release or secure flap 9. A shaft aperture 12 is provided in each side 6 of the body 1, preferably slightly offset toward tail end 8 from the midpoint of the body, to receive a drive shaft. A sealing gasket 13 is preferably connected to top 5 of body 1 around the edges of the opening into the interior of the body to seal against the edges of flap 9 and prevent water from splashing into the interior of body 1 when flap 9 is closed and the decoy is in use.

Figure 4:
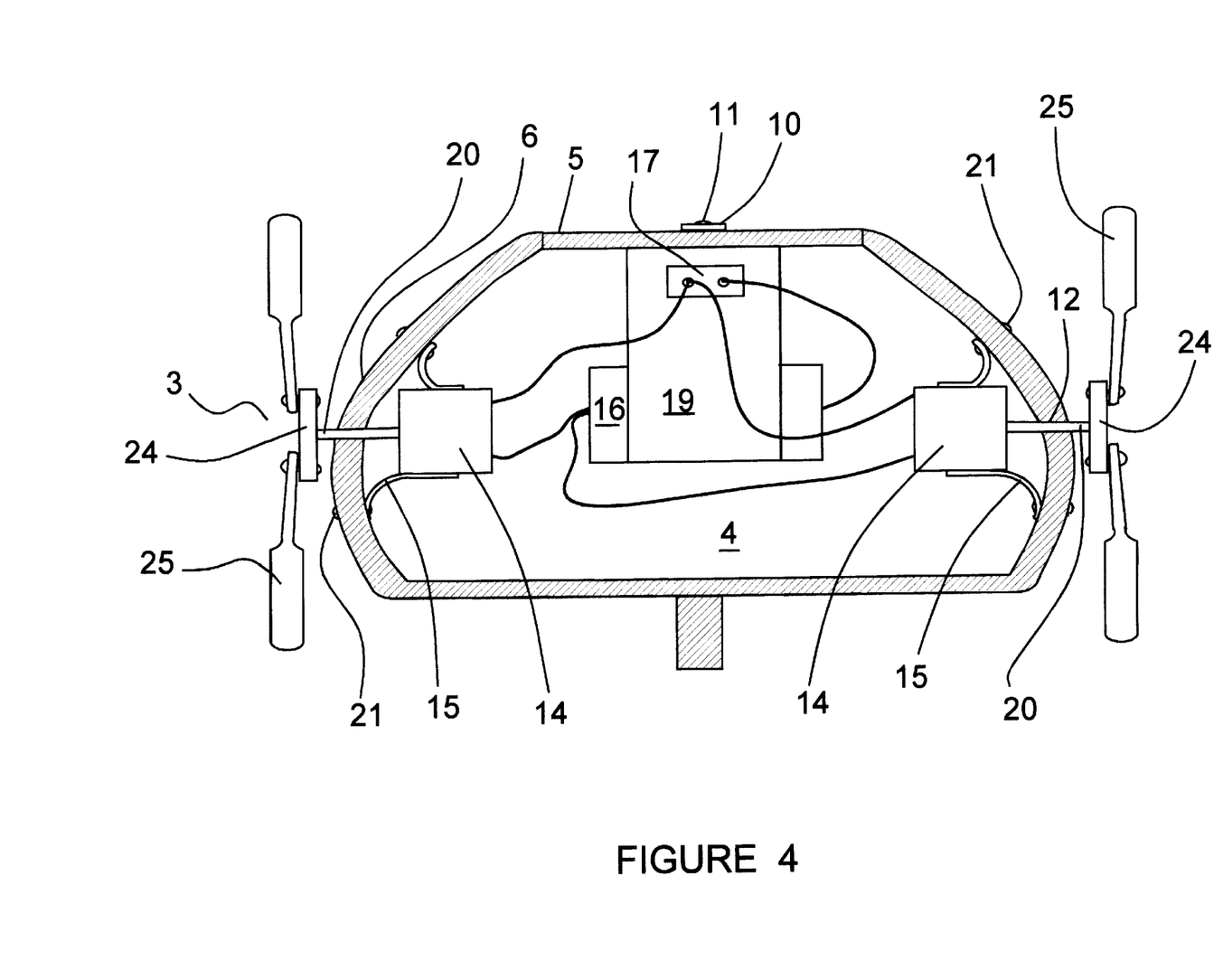
FIG. 4 is a cross-sectional view of the preferred embodiment of the decoy of the invention, along line 4—4 of FIG. 3.
Figure 5:
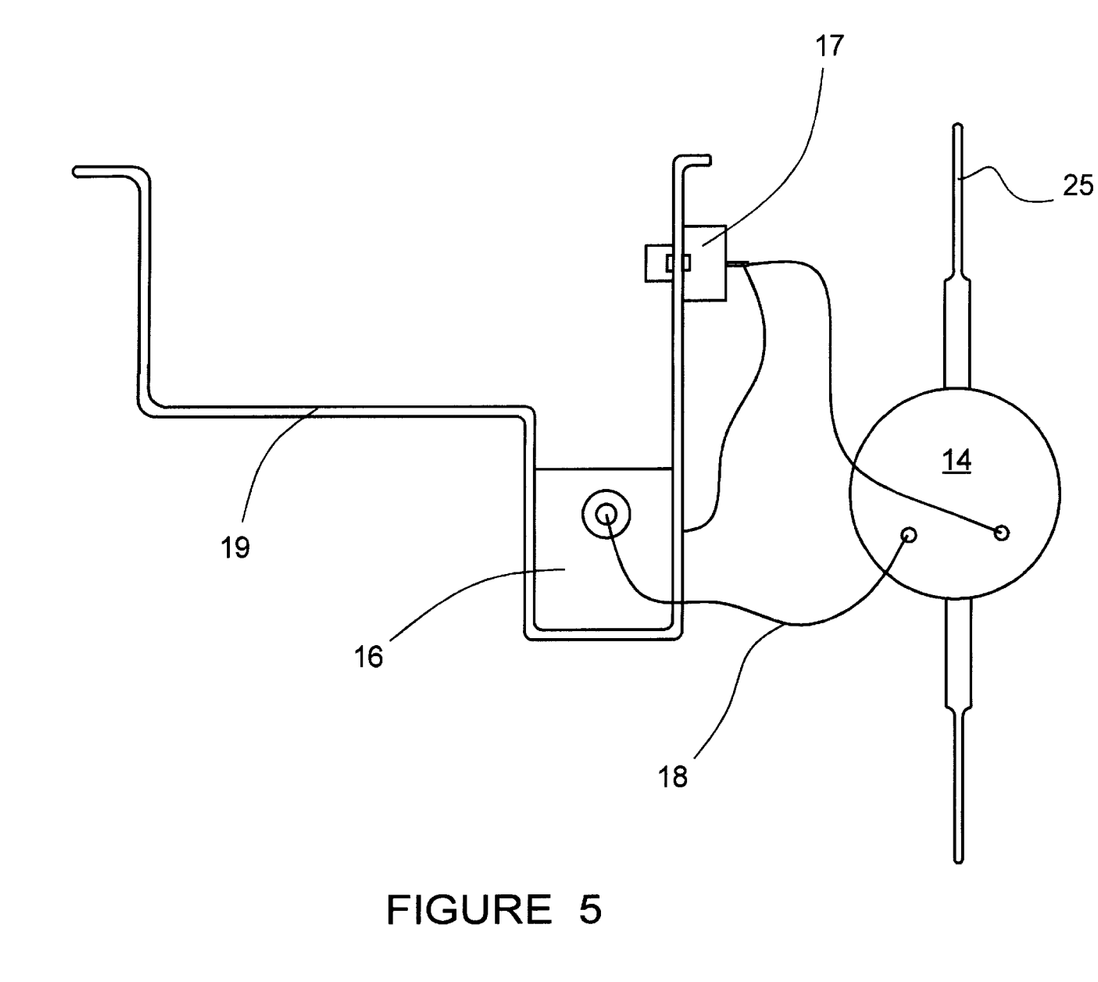
FIG. 5 is a side view of the preferred embodiment of the drive assembly of the invention, prior to installation into the body of a decoy, with one motor and paddle wheel assembly omitted for clarity.

In the preferred embodiment of the invention, drive assembly 2 generally includes a pair of battery powered electric motors 14, motor mounts 15, a battery holder 16 with on-off switch 17, associated wiring 18, and a mounting bracket 19 for the battery holder and switch. Each motor 14 includes an output shaft 20, which is caused to rotate when electrical power is applied to the motor. Each motor 14 preferably comprises a commercial 1.5 volt low speed electric motor with a no-load speed of approximately 115 rpm, which results in an operating speed under load of approximately 80 rpm. However, it should be understood that alternative drive means may be utilized instead of electric motors 14, such as other types of electric motors or even mechanically driven motors, within the scope of the invention. Each motor 14 is provided with a motor mount 15 which is secured to a respective side 6 of body 1 by fasteners 21, with output shaft 20 extending through a shaft aperture 12 to the exterior of body 1, as illustrated in FIG. 4.

A conventional commercially available battery holder 16 and conventional on-off slide switch 17 are secured to mounting bracket 19. Battery holder 16 includes positive and negative contacts connected to switch 17 and motors 14 by wiring 18. Battery holder 16 is preferably sized for one 1.5 volt D-cell battery 22. Again, it should be understood that other types of battery holders, switches, and configurations may be utilized, if desired, within the scope of the invention. Mounting bracket 19 is preferably made from corrosion-resistant aluminum and is shaped to accommodate the components of the drive assembly attached to it and to position the battery holder and switch to facilitate access to them with the drive assembly installed in the body of the decoy. Mounting bracket 19 is secured in the interior of body 1 by fasteners 23 and 11.

The drive assembly of the invention is inserted into the hollow interior of the body through the opening in the top of the body with flap 9 lifted to provide access. Each motor 14 is positioned on a respective side of the body with its output shaft 20 extending through a shaft aperture 12, and secured in place with fasteners 21. In the preferred embodiment output shafts 20 function directly as drive shafts for the paddle wheel assemblies 3. Mounting bracket 19, with battery holder 16 and switch 17 connected thereto, is secured in position in the hollow interior of the body with fasteners 23 and 11. Fastener 11 is used as a common fastener for both latch 10 and the tail end of mounting bracket 19. Wiring 18 may be connected between battery holder 16, switch 17, and motors 14 before or after attachment of those components to the body of the decoy. It should be noted that while switch 17 is included in the preferred embodiment of the drive assembly, the switch could be omitted so that motors 14 are activated by insertion of a battery into the battery holder and deactivated by removal of the battery.

Figure 1:
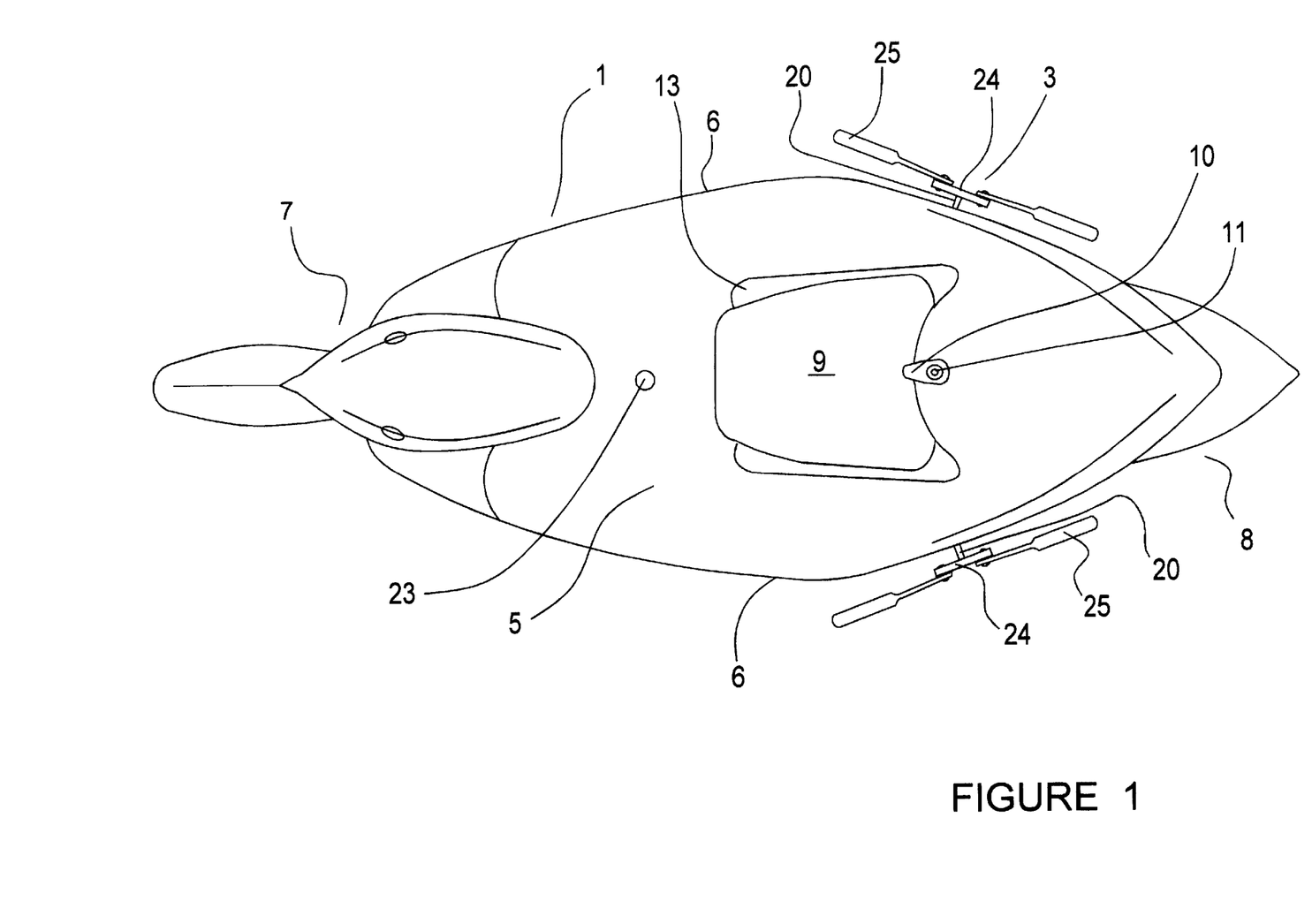
FIG. 1 is a top view of a decoy of the preferred embodiment of the invention.
Figure 2:
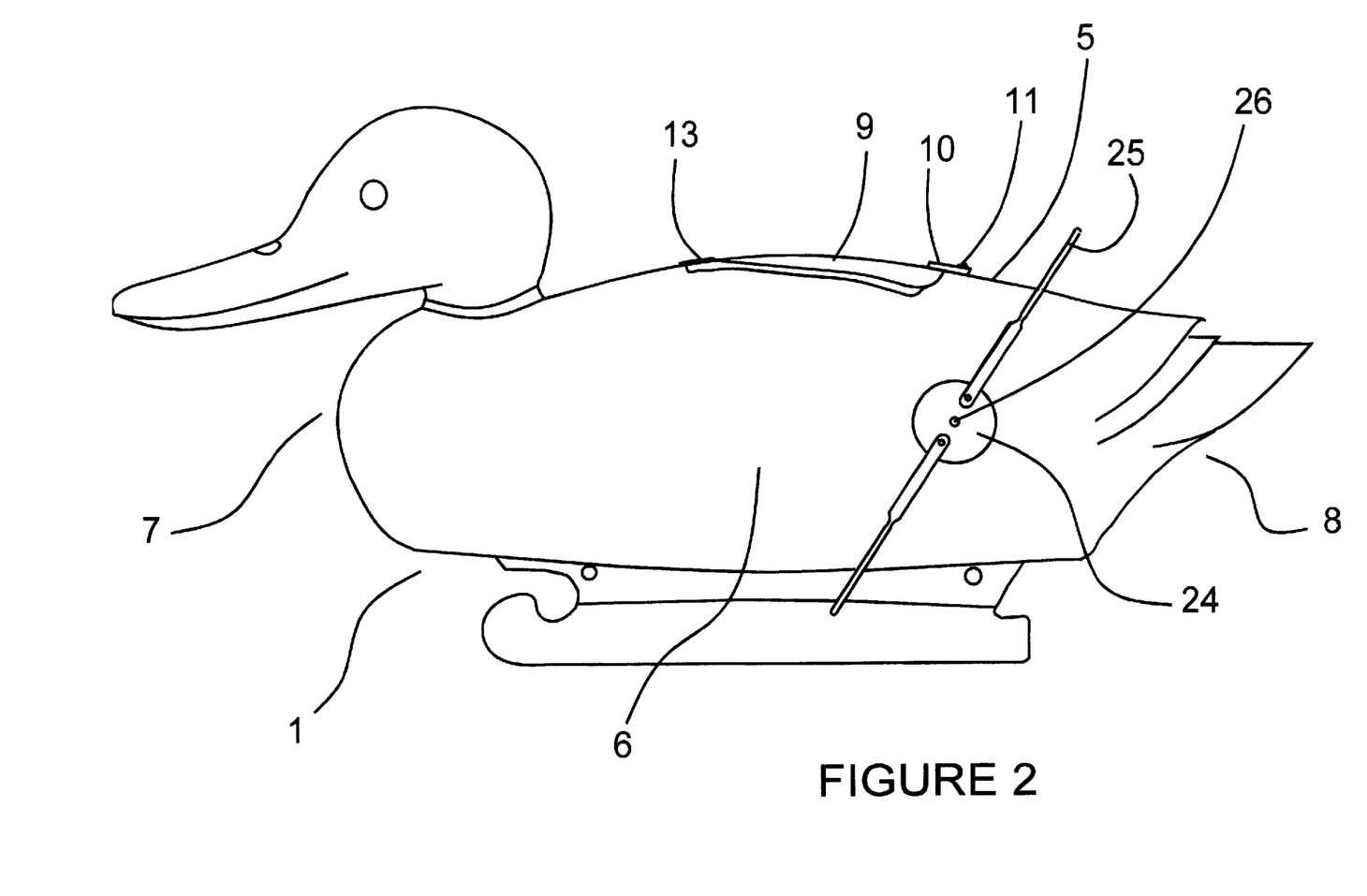
FIG. 2 is a side view of a decoy of the preferred embodiment of the invention as shown in FIG. 1.
Figure 3:
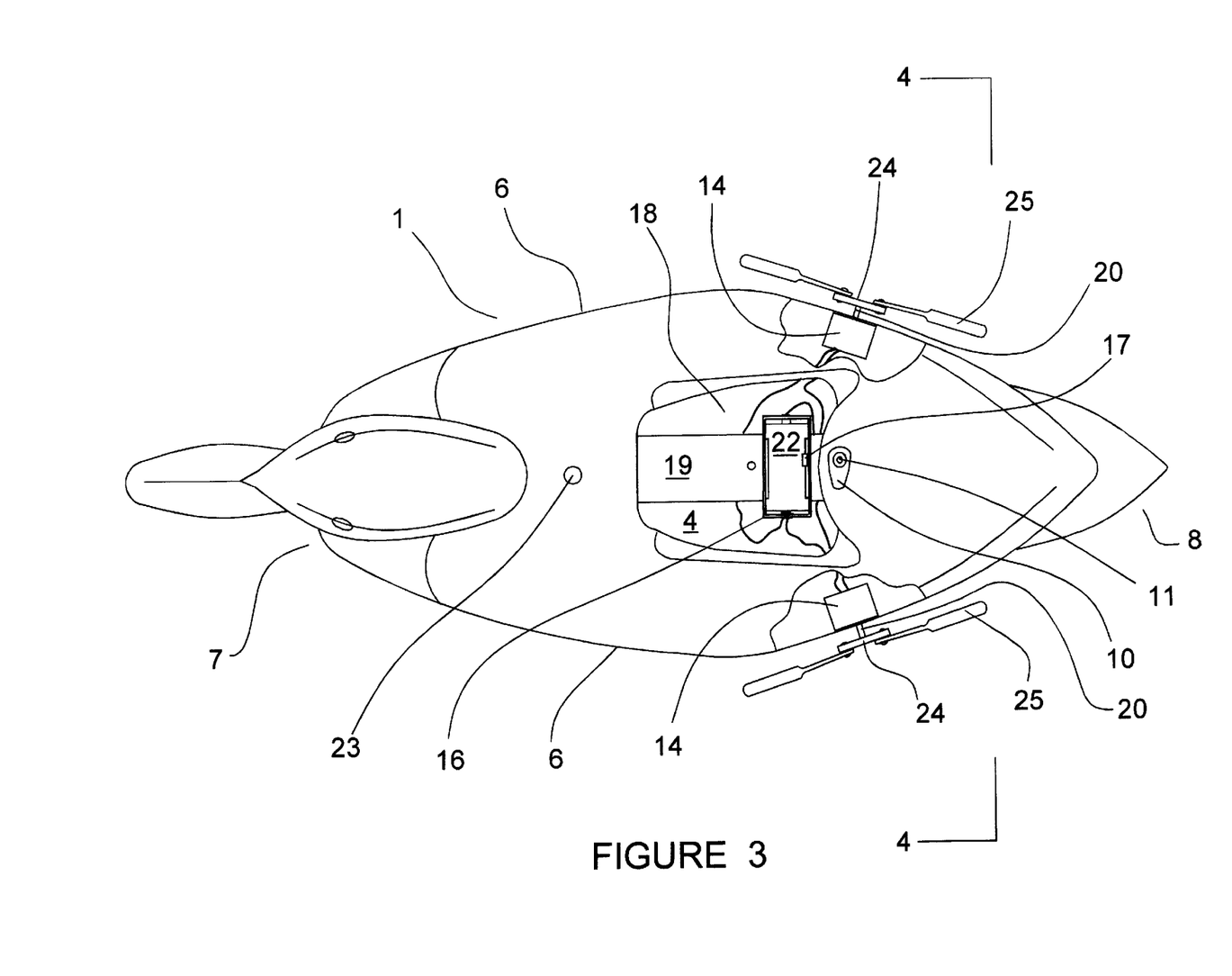
FIG. 3 is a top view of the drive assembly and paddle wheel assemblies of the preferred embodiment of the invention, installed in a decoy body, with the lid flap removed to show the installation.

The drive assembly of the decoy operates the paddle wheel assemblies 3 to propel the decoy through the water and splash water toward the tail end of the decoy. Each paddle wheel assembly 3 comprises a hub 24 for connection to a drive shaft associated with a motor 14, and a plurality of paddles 25 connected to and extending outwardly from the hub. Each hub 24 includes a hub aperture 26 to receive a portion of a drive shaft. Each paddle wheel assembly is connected to the associated drive shaft by any convenient conventional means, such as a set screw, mating splines, or mating screw threads. The paddle wheel assemblies may be formed with hub 24 and paddles 25 as separate components with the paddles connected to the hub by fasteners, as illustrated in, e.g., FIGS. 2 and 4, or the hub and paddles may be integrally formed as a single unit, as illustrated in FIGS.

Figure 7:
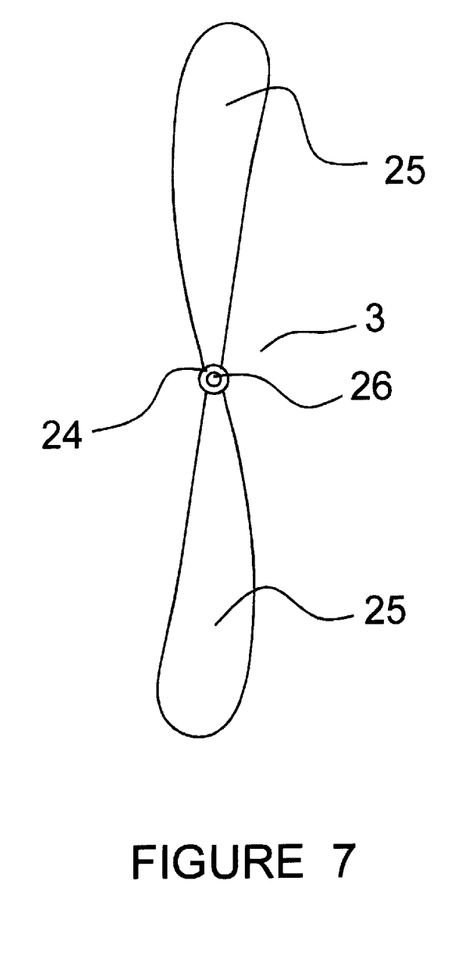
FIG. 7 is a front view of an alternative embodiment of a paddle wheel, viewed perpendicular to the plane of the paddle wheel.
Figure 8:
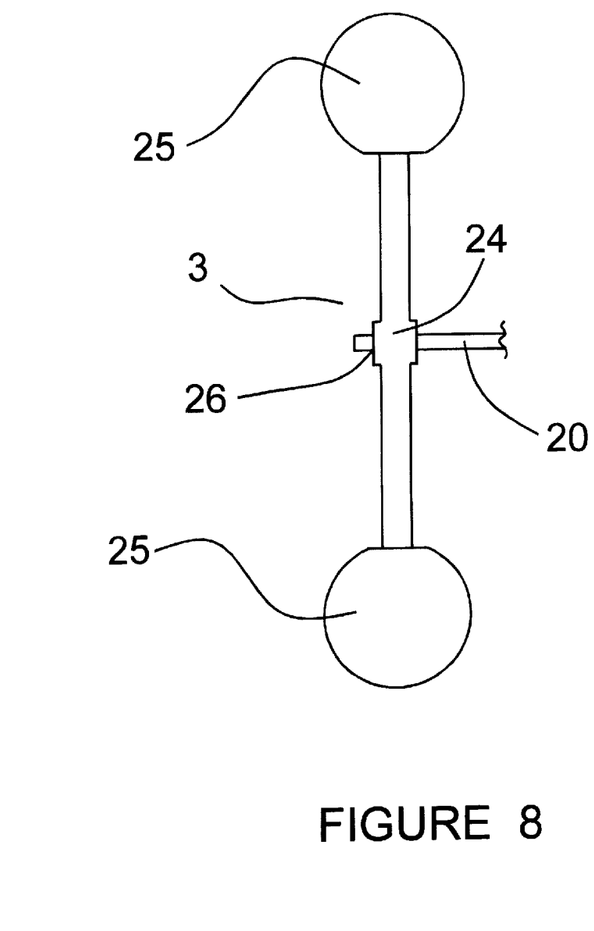
FIG. 8 is a side view of an another alternative embodiment of a paddle wheel, viewed parallel to the plane of the paddle wheel.
Figure 9:
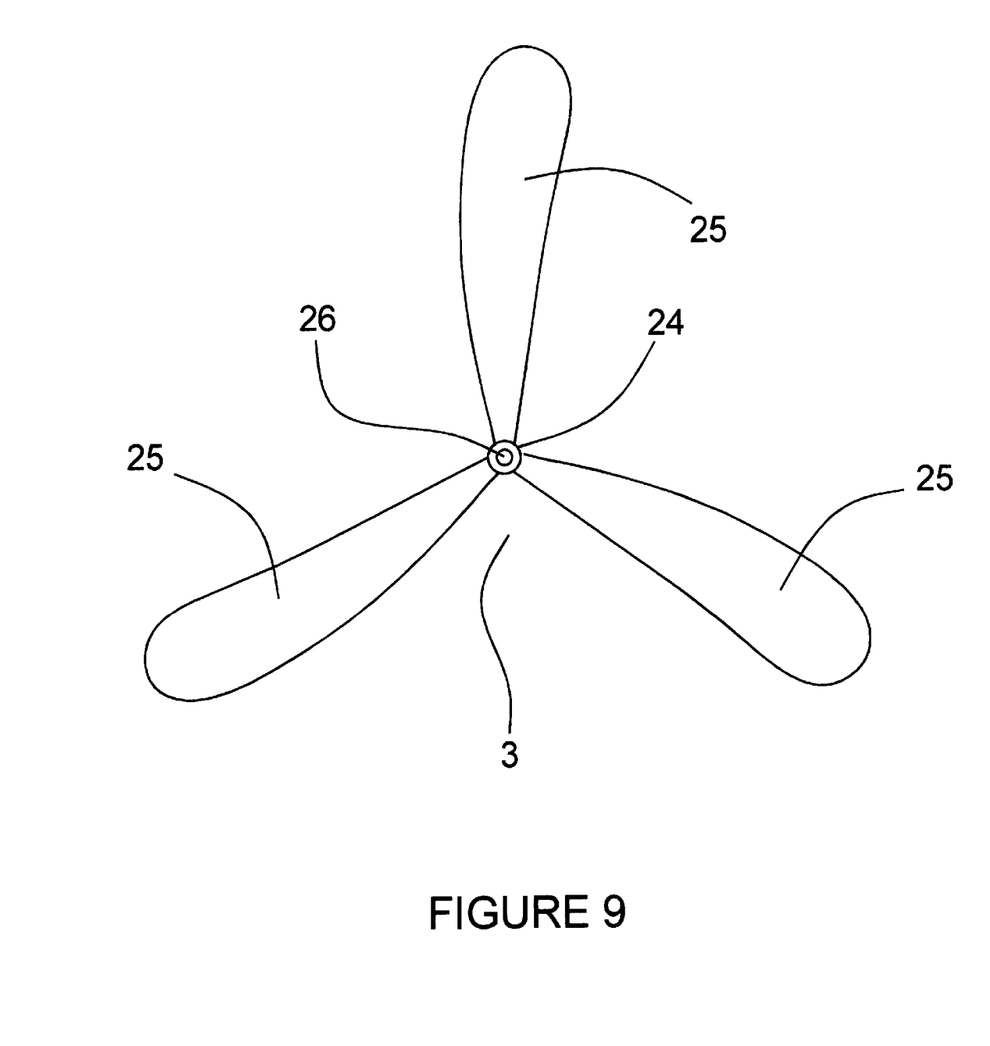
FIG. 9 is a front view of a further alternative embodiment of a paddle wheel, viewed perpendicular to the plane of the paddle wheel.
Figure 10:
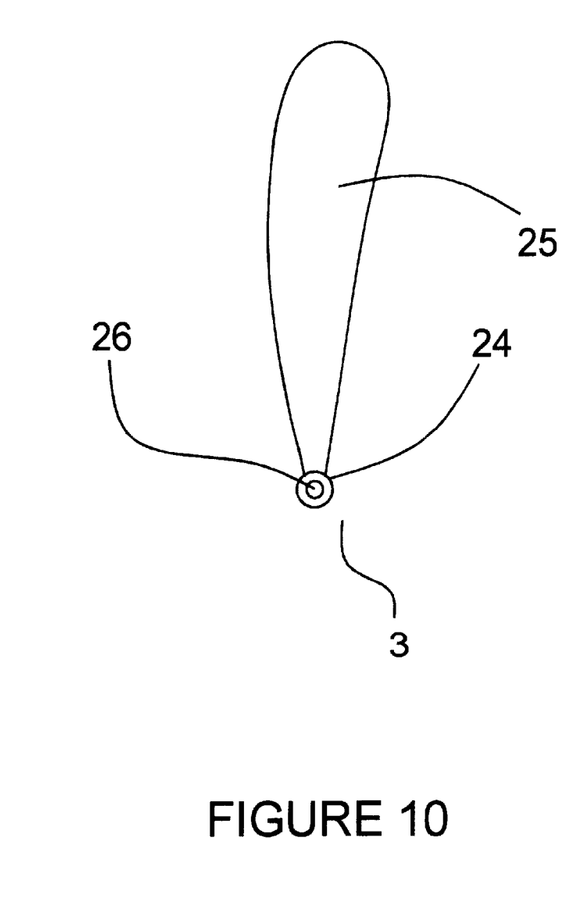
FIG. 10 is a front view of a still further alternative embodiment of a paddle wheel, viewed perpendicular to the plane of the paddle wheel.

7, 8, and 9. In the preferred embodiment the number of paddles associated with each paddle wheel is two, and the paddles are disposed in directly opposed relation on either side of the hub. Each paddle is of sufficient length that a portion of the paddle will extend below the surface of the water when the paddle is positioned with its longitudinal axis perpendicular to the surface. It is preferred that no more than about half the length of each paddle extends into the water at its deepest penetration. The width of the portion of each paddle that engages the water is relatively narrow in relation to the length of the paddle. It will be readily understood that the surface area of the portion of each paddle that is drawn through the water as the paddle wheels rotate will determine the speed at which the decoy is propelled through the water and the volume of water splashed toward the tail end of the decoy, assuming the rate of rotation remains constant. Accordingly, the paddle configuration and dimensions can be adjusted to achieve the desired decoy speed and splash pattern. Alternative paddle wheel assembly configurations utilizing two paddles for each assembly are illustrated in FIGS. 7 and 8. The speed at which the decoy is propelled and the splash pattern can also be altered by adding paddles to the paddle wheel assembly. An alternative paddle wheel assembly configuration with three paddles is illustrated in FIG. 9. Although not preferred, a paddle wheel assembly with a single paddle, as shown in FIG. 10, could be used.

It is preferred that shaft apertures 12 be positioned slightly toward the tail end 8 of the decoy body from the midpoint of the body, so that the output shafts of motors 14 extend outward from the sides 6 of the body at an angle relative to a line drawn perpendicular to the longitudinal axis of the body. In this preferred configuration the plane of rotation of each paddle wheel assembly is at an angle to the longitudinal axis of the decoy. The preferred position of the paddle wheel assemblies reduces the forward speed of the decoy compared to a position with the plane of rotation parallel to the longitudinal axis (at a given rotational speed), and directs splashed water inward toward the wake of the decoy rather than alongside the wake. The preferred position also directs a portion of the propulsive force produced by each paddle wheel assembly outwardly from the longitudinal axis of the decoy. Unless the rotation of the two paddle wheel assemblies is synchronized and the positions of the paddles on each side of the decoy are aligned, paddles on opposite sides of the decoy will be drawn through the water at different times and the uneven application of propulsive force will cause the body of the decoy to "waggle" from side to side, further mimicking movements exhibited by live birds. Because the speed of rotation of the two motors 14 will typically vary slightly, the degree of synchronization of the two paddle wheel assemblies will change during operation of the decoy, and the degree of sideways movement by the decoy will vary over time, enhancing its mimicry of natural waterfowl behavior.

Figure 11:
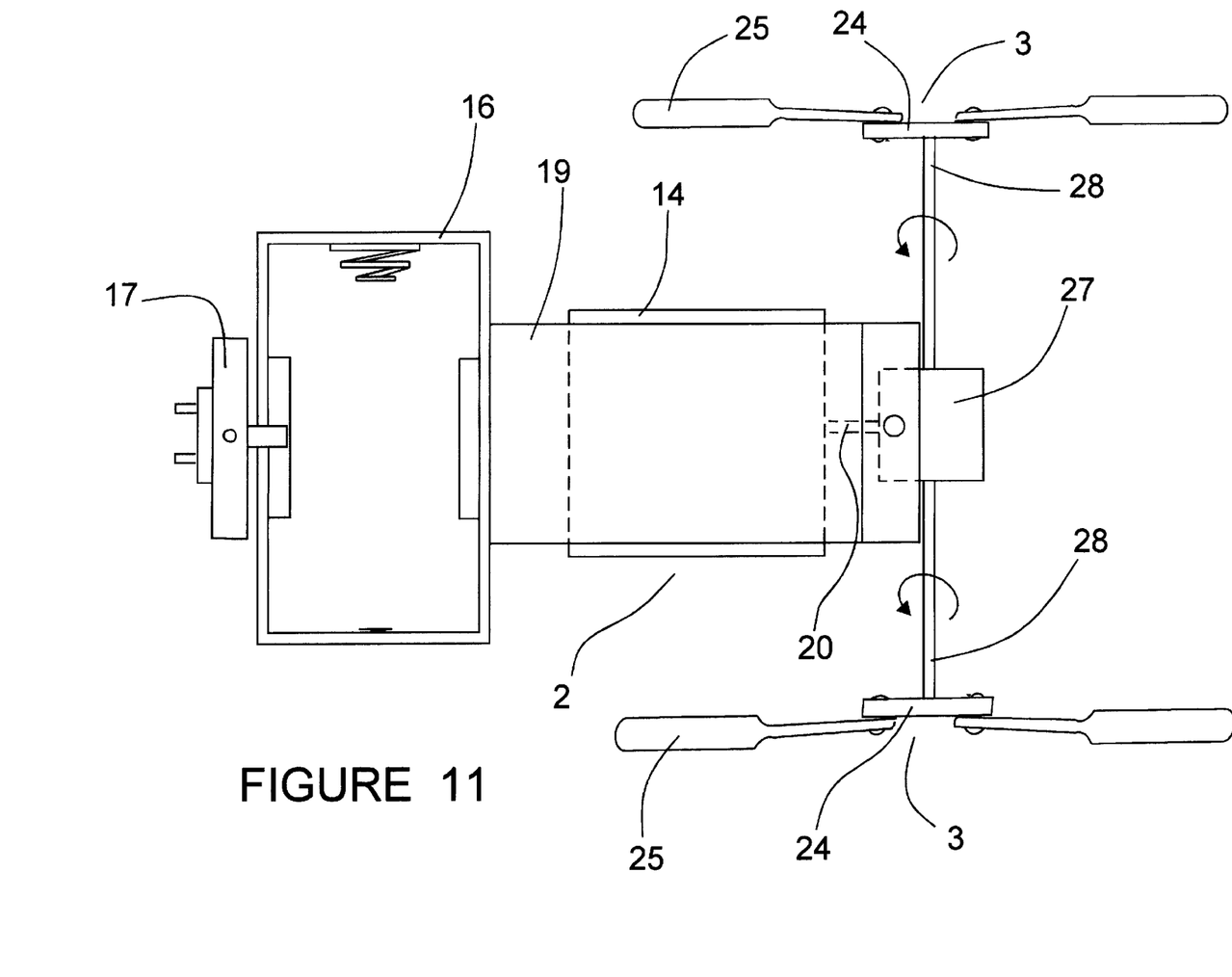
FIG. 11 is a top view of an alternative embodiment of the drive assembly of the invention.
Figure 12:
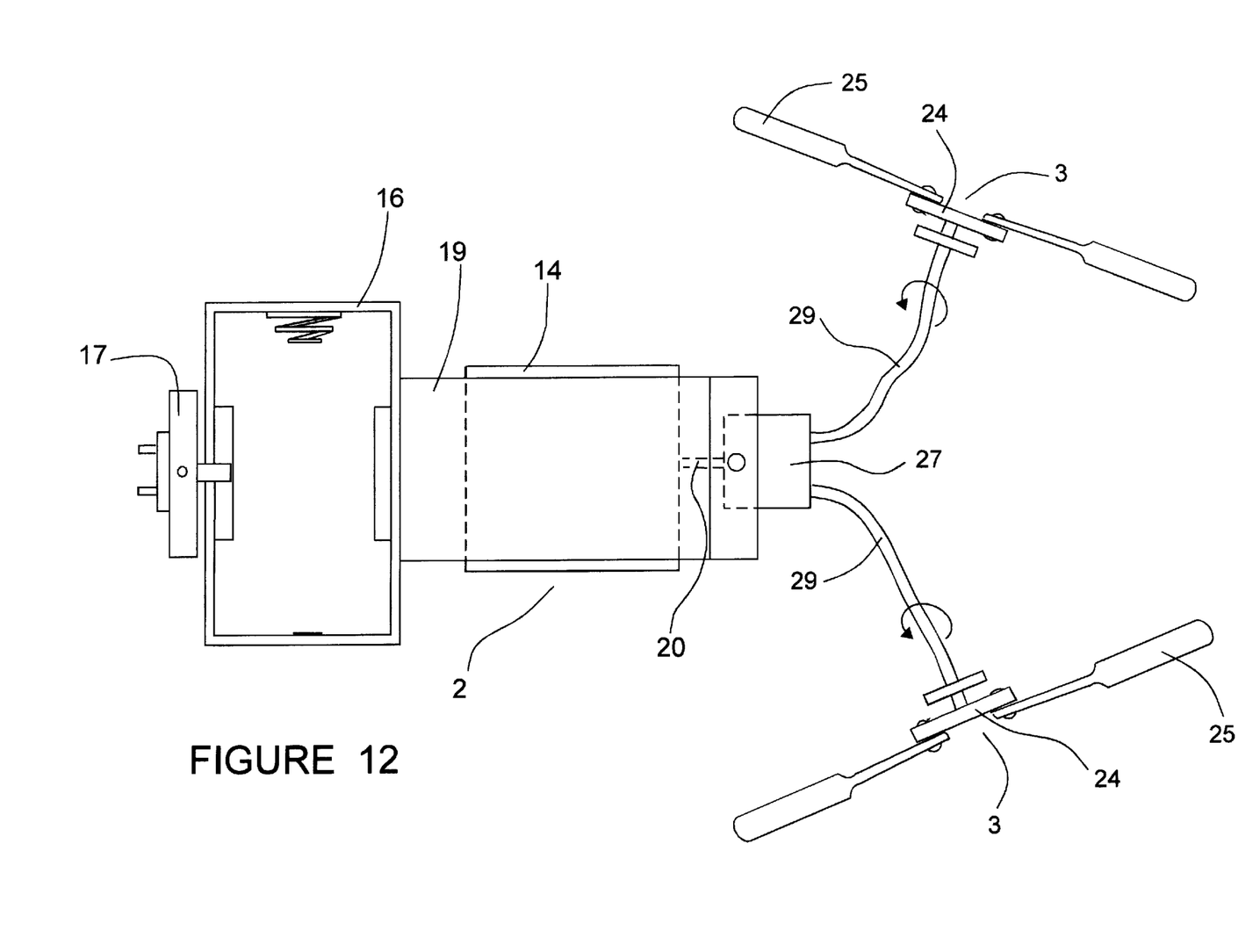
FIG. 12 is a top view of another alternative embodiment of the drive assembly of the invention.
Figure 13:
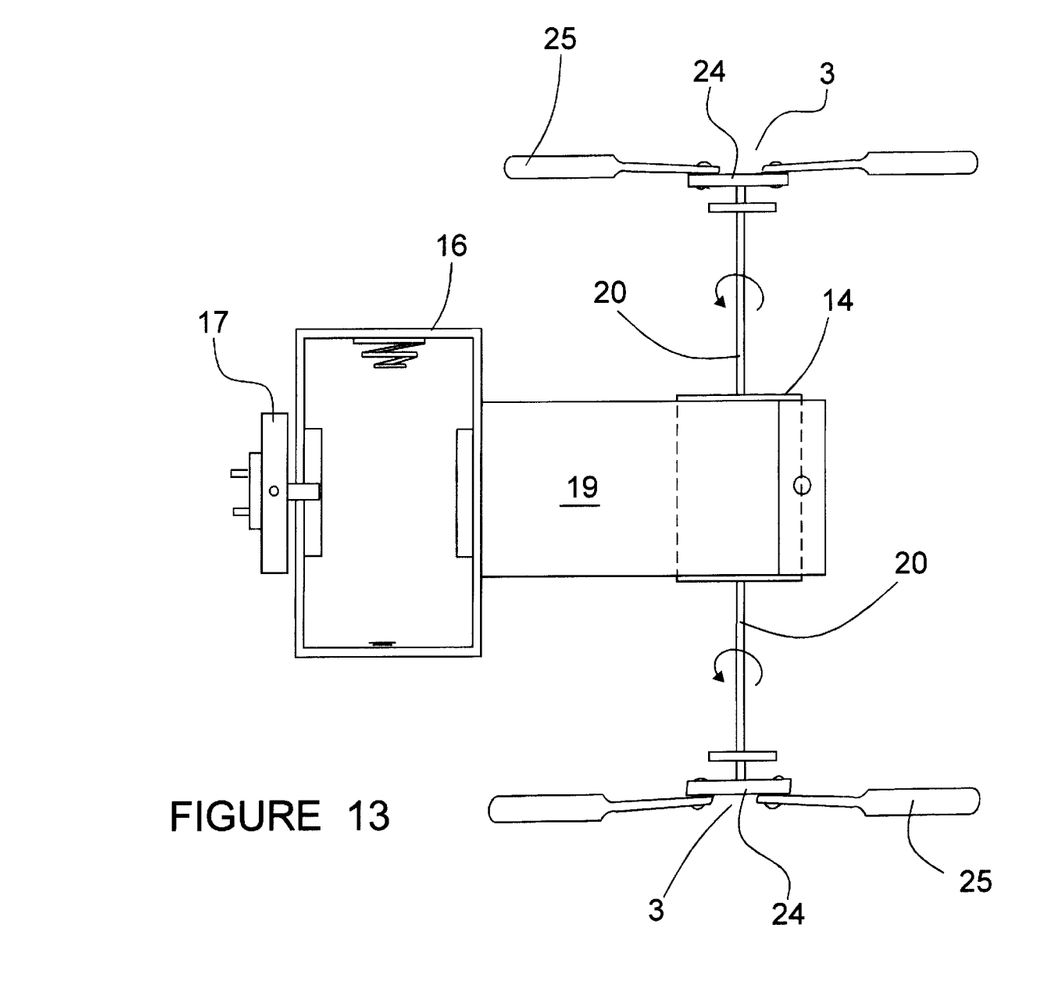
FIG. 13 is a top view of a further alternative embodiment of the drive assembly of the invention.

In addition to alternative embodiments of the paddle wheel assemblies, such as those described above, alternative embodiments of the drive assembly of the invention may also be utilized. In a first alternative embodiment, illustrated in FIG. 11, a single motor 14 is used to drive both paddle wheel assemblies. In this alternative approach the motor is attached to mounting bracket 19 with output shaft 20 extending parallel to the longitudinal axis of body 1. Output shaft 20 is coupled to a transmission unit 27 from which rigid drive shafts 28 extend through shaft apertures 12. In another alternative embodiment, illustrated in FIG. 12, a single motor 14 is also coupled to a transmission unit 26, but the rigid drive shafts 27 are replaced by flex shafts 29. The use of flex shafts would facilitate the preferred offset placement of the paddle wheel assemblies as compared to the use of rigid drive shafts. In a further alternative embodiment, illustrated in FIG. 13, a single motor 14 with dual output shafts 20 is used. In the embodiment of FIG. 13, motor 14 is disposed transverse to the longitudinal axis of the body of the decoy and is connected to mounting bracket 19 with its output shafts extending outwardly and through the opposed shaft apertures 12 in the sides of the decoy body.

Figure 6:
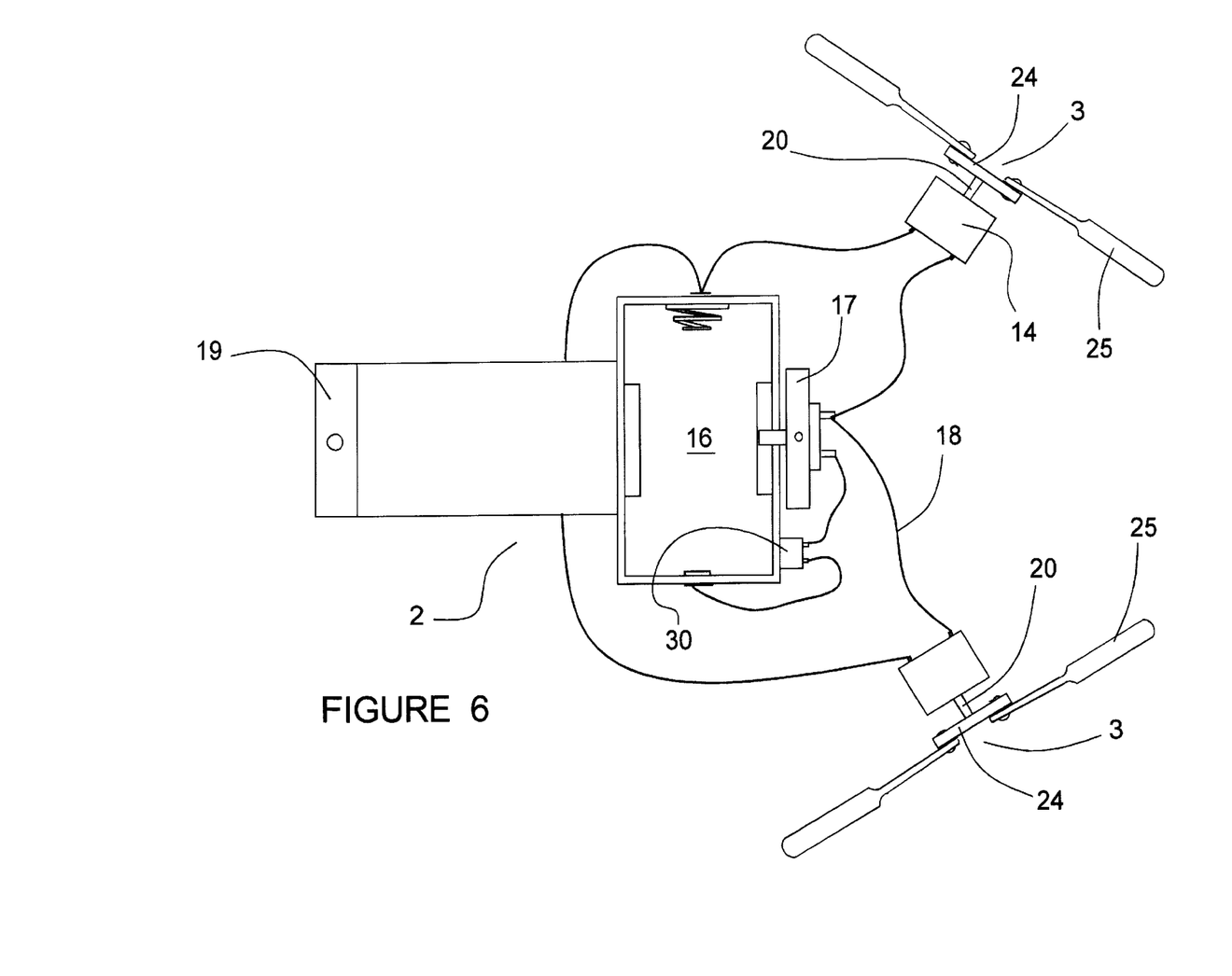
FIG. 6 is a top view of the drive assembly and paddle wheel assemblies of the preferred embodiment of the invention.

As an alternative to the use of an "on-off" type switch for switch 17 of the preferred embodiment, a variable resistance switch may be utilized to allow the speed of motor(s) 14 to be adjusted by a user of the decoy. It will be understood that the variable resistance switch alternative embodiment may be used to control motors 14 of the preferred embodiment or to control the single motor 14 of any of the disclosed alternative embodiments. In a further alternative embodiment for controlling the operation of motor(s) 14, an interrupter relay 30 may be included in the electrical circuit, as generally illustrated in FIG. 6. Relay 30, if used, will intermittently interrupt the flow of electrical power from the battery to the motor(s), resulting in intermittent movement and splashing by the decoy instead of the continuous movement and splashing exhibited by the preferred embodiment. Like the alternative variable resistance switch, this alternative may be used with any of the alternative motor and drive embodiments as well as with the preferred dual motor embodiment.

The foregoing description of the preferred embodiment and certain alternative embodiments of the invention is intended to be illustrative and not limiting. The invention is susceptible to further alternative embodiments and variations in design and in use, all within the scope of the invention as disclosed and claimed.

What is claimed is:

1. A self-propelled waterfowl decoy adapted to float on and propel itself along the surface of a body of water, comprising a body with a head end, a tail end, a longitudinal axis extending through said head end and said tail end, a top, two opposing sides, and a hollow interior, said body having a pair of shaft apertures formed in said sides of said body in opposed relation across said longitudinal axis of said body and said body being balanced to float on said surface of said body of water with said longitudinal axis generally parallel to said surface;

drive means disposed in said hollow interior of said body, said drive means including a pair of rotatable drive shafts each extending through a respective one of said shaft apertures in said sides of said body from said interior to the exterior thereof; and a pair of paddle wheel assemblies, each having a hub, a hub aperture in said hub to receive one of said drive shafts therethrough so as to connect said hub to said drive shaft, and at least one paddle with a first end and a second end, connected at said first end to and extending outwardly from said hub, each of said paddle wheel assemblies connected to a separate one of said drive shafts.

2. The self-propelled waterfowl decoy of claim 1, said body further comprising openable and closable access means for the purpose of selectively gaining access to said interior of said body.

3. The self-propelled waterfowl decoy of claim 2, wherein said access means comprises a flap formed in said top of said body, said flap pivotably connected to said top of said body, and a latch to selectively secure said flap in a closed position.

4. The self-propelled waterfowl decoy of claim 1, wherein said drive means comprises a pair of motors each having a rotatable output shaft, each of said motors disposed in said hollow interior of said body and connected to said body with said output shaft of each of said motors extending through a separate one of said shaft apertures, and wherein said output shafts of said motors comprise said drive shafts of said drive means.

5. The self-propelled waterfowl decoy of claim 4, wherein said drive means further comprises switch means for selectively activating and deactivating said motors.

6. The self-propelled waterfowl decoy of claim 5, wherein said motors are battery powered electrical motors, wherein said drive means further comprises a battery holder to receive a battery for actuating said motors, and wherein said drive means further comprises electrical wiring connected between said battery holder and said motors through said switch means, such that said motors are activated when a battery is placed in said battery holder and said switch is operated to conduct electrical current therethrough and said motors are deactivated when said switch is operated to interrupt the flow of electrical current.

7. The self-propelled waterfowl decoy of claim 4, wherein said motors are battery powered electrical motors, wherein said drive means further comprises a battery holder to removably receive a battery for actuating said motors, and wherein said drive means further comprises electrical wiring connected between said battery holder and said motors, such that said motors are activated when a battery is placed in said battery holder and deactivated when said battery is removed from said battery holder.

8. The self-propelled waterfowl decoy of claim 6, wherein said drive means further comprises automatic interrupter means for temporarily interrupting the flow of electrical current through said wiring so as to intermittently interrupt the activation of said motors.

9. The self-propelled waterfowl decoy of claim 7, wherein said drive means further comprises automatic interrupter means for temporarily interrupting the flow of electrical current through said wiring so as to intermittently interrupt the activation of said motors.

10. The self-propelled waterfowl decoy of claim 5, wherein said switch means comprises a variable resistance switch for additionally selectively controlling the speed of said motors.

11. The self-propelled waterfowl decoy of claim 3, wherein said access means further comprises a gasket interconnected to said top of said body so as to form a generally water tight seal between said flap and said top of said body with said flap in a closed position.

12. The self-propelled waterfowl decoy of claim 1, wherein the number of paddles comprising each of said paddle wheel assemblies is two.

13. The self-propelled waterfowl decoy of claim 1, wherein the number of paddles comprising each of said paddle wheel assemblies is three.

14. The self-propelled waterfowl decoy of claim 1, wherein the number of paddles comprising each of said paddle wheel assemblies is one.

15. The self-propelled waterfowl decoy of claim 1, wherein said drive means comprises a motor disposed in said hollow interior of said body, said motor having a rotatable output shaft, a transmission unit disposed in said hollow interior of said body and connected to said output shaft of said motor, and a pair of drive shafts extending outwardly from said transmission unit and through said shaft apertures in said body for connection of said paddle wheel assemblies thereto.

16. A self-propelled waterfowl decoy adapted to float on and propel itself along the surface of a body of water, comprising a body with a head end, a tail end, a longitudinal axis extending through said head end and said tail end, a top, two opposing sides, and a hollow interior, said body having a pair of shaft apertures formed in said sides of said body in opposed relation across said longitudinal axis of said body and said body being balanced to float on said surface of said body of water with said longitudinal axis generally parallel to said surface;

a drive assembly including motor means disposed in said hollow interior of said body, and a pair of rotatable drive shafts driven by said motor means, said drive shafts extending from said interior of said body through said respective shaft apertures with a portion of each of said drive shafts extending outwardly from a respective one of said sides of said body; and a pair of paddle wheel assemblies, each having a hub, a hub aperture in said hub to receive one of said drive shafts therethrough so as to connect said hub to said drive shaft, and a plurality of paddles each having a first end and a second end, each of said paddles connected at said first end to and extending outwardly from said hub, each of said paddle wheel assemblies connected to a separate one of said drive shafts such that said paddle wheel assemblies are caused to rotate upon rotation of said drive shafts.

17. The self-propelled waterfowl decoy of claim 16, wherein said motor means comprises a pair of motors, each having a rotatable output shaft, said motors disposed in said hollow interior of said body with said output shaft of each of said motors extending through a different one of said shaft apertures in said body, and wherein said output shafts of said motors comprise said drive shafts.

18. The self-propelled waterfowl decoy of claim 16, wherein said motor means comprises at least one battery powered electrical motor, and wherein said drive assembly further comprises a battery holder for removably receiving a battery and electrical wiring connected between said battery holder and said at least one electrical motor to form an electrical circuit including said battery, said battery holder, and said at least one electrical motor.

19. The self-propelled waterfowl decoy of claim 18, wherein the number of said electrical motors is two, each having a rotatable output shaft, and wherein said motors are disposed in said hollow interior of said body with said output shaft of each of said motors extending through a different one of said shaft apertures in said body, and wherein said output shafts of said motors comprise said drive shafts.

20. The self-propelled waterfowl decoy of claim 18, wherein the number of said electrical motors is one, wherein said electrical motor has a rotatable output shaft, and wherein said drive assembly further comprises a transmission unit connected to said output shaft of said motor, with said drive shafts connected to said transmission unit such that rotation of said output shaft of said motor is transmitted to said transmission unit and from said transmission unit to said drive shafts.

* * * * *